Sept. 7, 1965    C. F. ALDRIDGE ETAL    3,204,600
TENDENCY INDICATORS FOR USE IN BAROMETERS
AND OTHER INSTRUMENTS
Filed April 3, 1963
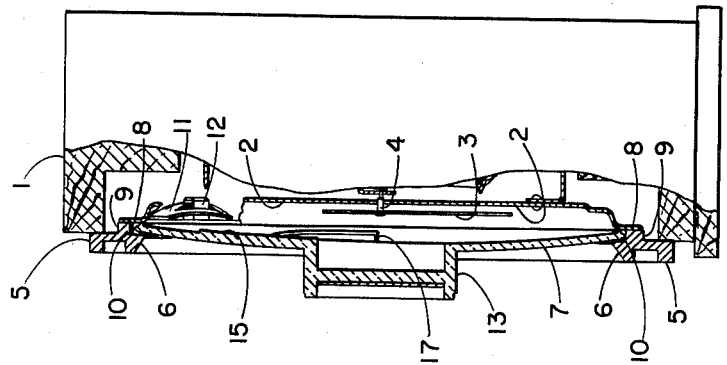
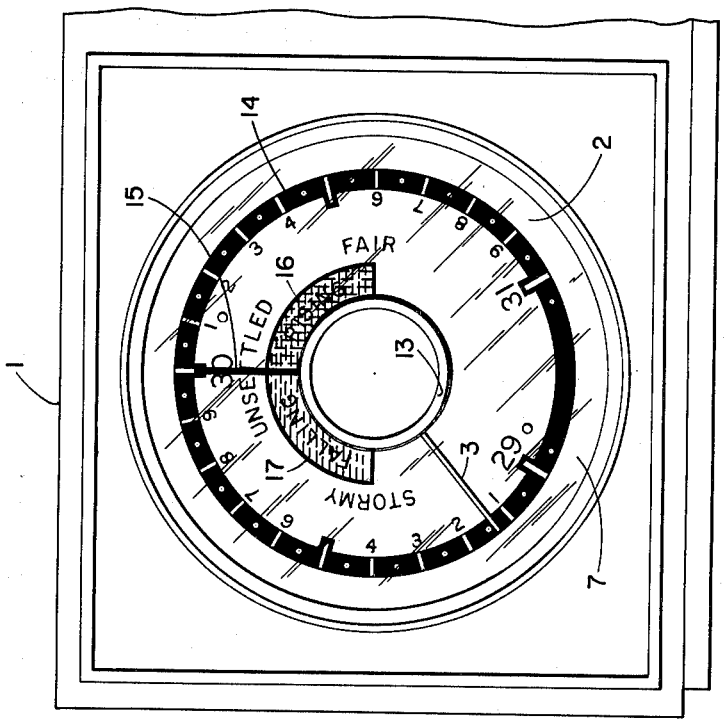
INVENTORS
C. Foster Aldridge
Joseph B. Federico

United States Patent Office 3,204,600
Patented Sept. 7, 1965

3,204,600
TENDENCY INDICATORS FOR USE IN BAROMETERS AND OTHER INSTRUMENTS
Clarence Foster Aldridge, Perinton, and Joseph B. Federico, Rochester, N.Y., assignors to Taylor Instrument Companies, Rochester, N.Y., a corporation of New York
Filed Apr. 3, 1963, Ser. No. 270,299
6 Claims. (Cl. 116—129)

This invention relates to improvements in tendency indicators for barometers, and the like.

The use of barometers in forecasting weather conditions requires knowledge of changes in barometer readings. That is, changes in the weather are preceded and/or accompanied by changes in the various measurable atmospheric conditions that go to define and/or tangibly form part of the overall state of affairs known as "the weather." In particular, changes or lack of changes in barometric pressure occurring over periods of a few hours and up herald the coming of storms, the approach of fair weather, the continuance of a given state of the weather, and so on.

Customarily, therefore, barometers are generally equipped with some kind of hand-set tendency indicator that can be set at any given indication of the barometer dial or scale, so that at some future time the indication of the barometrically-moved indicator of the barometer can be compared with the tendency indicator in order to determine the sense and/or amount of barometric pressure change since the time, and with respect to the indication, at which the tendency indicator was set. Of course, the tendency indicator is normally set to indicate the barometer reading indicated by the barometrically-operated indicator of the barometer at the time of setting.

We have devised a novel tendency indicator characterized by simplicity, economy of parts, ease and economy of manufacture, neatness and attractiveness of appearance, and effectiveness and ease in use.

In the drawings:

FIGURE 1 represents a front elevation of a barometer provided with a tendency indicator according to the invention; and FIGURE 2 represents a side elevation of the aforesaid barometer, partly in section showing structural detail appertinent to the said tendency indicator.

The barometer illustrated in the drawing is preferably one having a wide sweep of its scale, preferably about 270° of circular arc, such as that described and claimed in the copending application for U.S. Letters Patent, Serial No. 270,311 filed April 3, 1963 and entitled "Improvements in Pressure Responsive Devices, e.g. Diaphragms, Capsules and Instruments Using Such Capsules and Diaphragms," in the name of Harvey A. Klumb and assigned to the assignee of our present application. However, other barometers of lesser scale sweeps, for a given barometric pressure interval, and quite different in structure from the barometer of Klumb are also suited for use with our novel tendency indicator. Accordingly, we will not describe the barometer as such any further than to state that, in essence, it is to be a device having a pointer or equivalent elongated index sweeping over an arcuate scale in response to atmospheric pressure.

In FIGURE 1, reference numeral 1 denotes a hollow body 1 of wood, plastic or other suitable material, variously supporting and encasing the different parts of a barometer mechanism, indicated partially in FIGURE 2, and including a scale-bearing plate 2, a pointed 3 mounted on an arbor 4 for rotation by suitable means (not shown) incorporated within the body 1 and to the right of the irregular boundary marking off the sectioned portion of body 1 from the remainder thereof.

The fore-portion (from the point of view of FIGURE 1) of body 1, is open to accommodate a face plate 5 having a circular opening defined by a bezel-like portion 6 and accommodating a circular crystal or cover-glass 7 of slightly larger diameter than the diameter of the portion 6. Scale-bearing plate 2 has a peripheral flange 8 of larger diameter than crystal 7. Bezel-like portion 6 has a circular lip 9 projecting therefrom which the flange 8 abuts closely so as to define a circular trough 10 between flange 8 and the inner periphery of bezel-like portion 6. The dimensions of the several parts described in the preceding are selected to be such that the width of the trough 10 is sufficiently less than the peripheral thickness of crystal 7, whereby the crystal will be frictionally restrained from rotation.

Suitable retaining means are provided about the periphery of flange 8, for instance, a sheet metal nut 11 pressed down on post 12 projecting from the inner face of face plate 1 close enough to flange 8 that a portion of nut 11 overlaps the edge of the flange 8 and presses the same against lip 9, thus resiliently forcing the sides of trough 10 together such as to create frictional resistance rotation of crystal 7 with respect to the said sides of trough 10. It will be observed that scale-bearing plate 2 has been broken away entirely across its top portion in order to make visible nut 11 and post 12 that would otherwise be concealed by plate 2 in the section of FIGURE 2.

Though only one nut 11 and post 12 pair is shown, several such pairs will be provided about the periphery of scale-bearing plate 2, in sufficient number and at such spacing as to hold flange 8 against lip 9 more or less continuously thereabout. Face plate 5 and scale-bearing plate 2, as a unit, are preferably fixed against rotation by any suitable expedient (not shown) for fixing such unit to body 1, so that crystal 7 can be rotated in place without disturbing the orientation of plates 2 and 5, and body 1, with respect to one another. To facilitate rotation of crystal 7, it is provided with a knob 13 as an integral part thereof, so that if the knob is grasped firmly by the fingers and twisted on an axis normal to the plane of FIGURE 1 and more or less on the center of the circular outline of crystal 7, and sufficient torque is created to overcome the friction on the periphery of the crystal 7, the crystal 7 will rotate in place, and when released, maintain the position to which it has been rotated.

The purpose of rotating the crystal 7 is to provide for hand-setting the barometer tendency indicating means effectively forming an integral part of crystal 7, with respect to a circular scale 14, lying on the concave surface of plate 2 and divided into inches and fractions of inches of mercury column in the manner indicated in FIGURE 1.

Crystal 7 incorporates the said tendency indicating means in the form of a radial index line 15, an arcuate sector 16, and a second arcuate sector 17. As shown, sectors 16 and 17 are sections of a single larger sector. These three portions of the tendency indicator are of such appearance as to be visually distinct each from the other, from the crystal 7, and the front face of plate 2, when these entities are viewed from the point of view of FIGURE 1. As the drawing suggests, sector 16 is hatched for yellow or gold, and sector 17 for silver or gray. This scheme is particularly apt in that if, a few hours after the crystal 7 has been set with index line 15 at the same scale reading as pointer 3, i.e., said line overlies the said pointer, the pointer 3 then moves to a reading where the pointer lies directly under the zone 17, dismal or rainy weather may be expected shortly, whereas if said pointer moves under sector 16, then fair or clearing weather may be expected shortly, that is, speaking picturesquely, the prediction is gray skies or golden skies, respectively. This aspect of the tendency indicator is peculiarly useful, since the scale 14, legendry of various forecasting schemes often found thereon, and altitude setting of the barometer, may be dispensed with, since the color scheme of sectors 16 and 17 alone give both the sense of barometric change and specify interpretation thereof, without need for recourse to numerical information on the change of barometric pressure.

Preferably, the crystal 7 is colorless and transparent, the front surface of the scale plate white, silvery-white or the like, and the index line 15 a dark opaque color, such as black. As indicated in the FIGURE 1, conveniently the scale 14 is a dark opaque band interrupted by light bars and dots representing scale divisions. Pointer 3, which extends over the scale is a much lighter contrasting color, to contrast markedly with both scale 14 and index line 15.

The indicating elements of the tendency indicator, namely, index 15, the sectors 16 and 17, and as well any any legendry it is desired to put in the said sectors, as the FALLING and RISING illustrated in FIGURE 1, are preferably formed in projecting relief on the inner surface of crystal 7 as part of the process of shaping crystal 7 (as by molding, or other process for shaping substances in ductile or plastic condition). In FIGURE 2, the index 15 and, as well, the larger arc and two radially-positioned line segments that form all but the inner boundary of sector 17, are indicated. The relief view of the legend FALLING has been omitted in FIGURE 2 in order to avoid confusion.

Having the elements of the tendency indicator in relief on the crystal 7 greatly simplifies manufacturing the illustrated instrument, since no assembly is involved in providing the tendency indicator, for this is done essentially by coloring the sectors 16 and 17 and darkening the top of the relieved elements, steps that require very little time and few pains. It will be obvious that the outlines of the tendency indicator could also be provided in intaglio relief, stamped on, stenciled on, and so on, but at the price of requiring more care and effort in so doing, than when said outlines are provided in relief above the surface of the crystal 7.

The crystal, then, except for coloring, may be formed from clear plastic in a single act of molding, thereafter its relief being filled or topped with dark opaque paint to provide the solid black outlines for the tendency indicating means, and the yellow and gray tints of sectors 16 and 17 being painted or sprayed in via correspondingly tinted liquids having a slight temporary softening effect on the material of the crystal.

The crystal 7 could also be made of glass for glass is a substance that may be molded and colored to the same end and in corresponding fashion as in the case of clear plastic. Thus, ceramic "frits" and metallic stains can be used to provide colors and outlines in or on the surface of a glass crystal.

Having described our invention in the best form thereof to us known, and in sufficient detail to enable one skilled in the art to make use thereof, we claim:

1. A crystal of translucent material for a barometer, said crystal having thereon an arcuate sector having two sections defined by said translucent material in relief on a surface of said crystal, such relief being defined by the material of said crystal and following outlines of said sections, said outlines including a common boundary between the sections, and an arcuate boundary of each said section extending from a point on said common boundary, each said arcuate boundary extending away from each other.

2. The crystal of claim 1, wherein said relief includes means of contrasting appearance to said translucent material.

3. The crystal of claim 1, wherein the outlines of said arcuate sector include an arc of a circle and a segment of a radius of said circle, said arcuate boundaries of said sections composing said arc of a circle, and said common boundary including said segment of a radius of said circle.

4. In combination, a barometer having a scale plate, said scale plate having an arcuately arranged scale of barometric indicia thereon, said barometer having an index movable along said scale, and said index being movable, in response to variations in barometric pressure, along said scale, to indicate prevailing barometric pressure in terms of the said indicia; a rotatably mounted crystal for said scale plate, and means for rotating said crystal in place, said crystal being rotatably mounted on said barometer, over said scale plate; said crystal having an arcuate sector thereon corresponding to said scale but spaced inwardly therefrom with respect to the rotational axis of said crystal, and said index extending from said scale toward said axis, said sector being divided into two sector-form sections, each contrasting in appearance with the other and having a common, visually distinguishable boundary lying radially with respect to said axis, whereby to give the appearance of a second index; and there being provided a knob fixed to said crystal at the rotation axis of said crystal, whereby to act as said means for rotating said crystal in place.

5. In combination, a barometer having a scale plate, said scale plate having an arcuately arranged scale of barometric indicia thereon, said barometer having an index movable along said scale, and said index being movable, in response to variations in barometric pressure, along said scale, to indicate prevailing barometric pressure in terms of the said indicia; a rotatably mounted crystal for said scale plate, and means for rotating said crystal in place, said crystal being rotatably mounted on said barometer, over said scale plate; said crystal having an arcuate sector thereon corresponding to said scale but spaced inwardly therefrom with respect to the rotational axis of said crystal, and said index extending from said scale toward said axis, said sector being divided into two sector-form sections, each contrasting in appearance with the other an having a common, visually distinguishable boundary lying radially with respect to said axis, whereby to give the appearance of a second index, said sections being fields of color.

6. In combination, a barometer having a scale plate, said scale plate having an arcuately arranged scale of barometric indicia thereon, said barometer having an index movable along said scale, and said index being movable, in response to variation in barometric pressure, along said scale, to indicate prevailing barometric pressure in terms of the said indicia; a rotatably mounted crystal for said scale plate, and means for rotating said crystal in place, said crystal being rotatably mounted on said barometer, over said scale plate; said crystal having an arcuate sector thereon corresponding to said scale but spaced inwardly therefrom with respect to the rotational axis of said crystal, and said index extending from said scale toward said axis, said sector being divided into two sector-form sections, each contrasting in appearance with the other and having a common, visually distinguishable boundary lying radially with respect to said axis, whereby to give the appearance of a second index, said sections being translucent fields of color.

References Cited by the Examiner

UNITED STATES PATENTS

| 1,485,152 | 2/24 | Sandys | 73—387 |
|---|---|---|---|
| 2,006,873 | 7/35 | Purton | 116—129 |

FOREIGN PATENTS

| 5,364 | 3/14 | Great Britain. |
|---|---|---|
| 8,732 | 4/09 | Great Britain. |
| 259,755 | 10/26 | Great Britain. |

LOUIS R. PRINCE, *Primary Examiner.*

RICHARD QUEISSER, *Examiner.*